United States Patent [19]

Trimble

[11] Patent Number: 4,721,308
[45] Date of Patent: Jan. 26, 1988

[54] THUMB TWIDDLE OPERATED AMUSEMENT DEVICE

[76] Inventor: James A. Trimble, 7352 - 58th Ave., NE., Seattle, Wash. 98115

[21] Appl. No.: 870,957

[22] Filed: Jun. 5, 1986

[51] Int. Cl.$^4$ ............................................. A63H 33/26
[52] U.S. Cl. .................................. 273/148 B; 272/67; 272/1 R; 446/236; 446/175; 446/176; 128/25 R
[58] Field of Search ................... 273/148 B, DIG. 24, 273/DIG. 26; 272/8 N, 8 R, 67, 1 R; 446/236, 46, 47, 175, 176; 128/25 R

[56] References Cited

U.S. PATENT DOCUMENTS

| | | | |
|---|---|---|---|
| 2,819,081 | 1/1958 | Touraine | 273/148 B |
| 3,700,836 | 10/1972 | Rackson | 200/52 |
| 4,227,342 | 10/1980 | Knowles | 46/228 |

Primary Examiner—Richard C. Pinkham
Assistant Examiner—MaryAnn Stoll Lastova
Attorney, Agent, or Firm—Christensen, O'Connor, Johnson & Kindness

[57] ABSTRACT

Thumb twiddling devices that include a flat, hand-held housing (23) having a centrally located wheel (21) with an oblong thumb slot (35) and finger slots (33a, 33b) peripherally located about the wheel are disclosed. Thumb twiddling causes the rotation of the wheel (21) when a user's fingers (63) are interleaved together in the finger slots (33a, 33b) such that the thumbs lie in the thumb slot (35). In a toy form of the invention, thumb twiddle wheel rotations are sensed and the result used to control a display (49). In a controller form of the invention, sensed thumb twiddle wheel rotations are used to provide control signals suitable for controlling the movement of a video game object. Direction (e.g., steering) signals are provided by a tilt sensor mounted in the flat housing. Several thumb twiddle controllers can be used simultaneously by several video game "players" to control their respective objects in an interactive game.

32 Claims, 13 Drawing Figures

FORWARD    REVERSE

THUMB TWIDDLE OPERATED AMUSEMENT DEVICE

TECHNICAL AREA

This invention relates to amusement devices and, more particularly, manually operated amusement devices.

BACKGROUND OF THE INVENTION

Thumb twiddling is a relaxing pastime practiced by some people that involves interleaving the fingers of one hand with the fingers of the other hand such that the thumbs face one another and orbitally rotating the thumbs about an imaginary axis located between the thumbs. While thumb twiddling is often practiced without mechanical aids, some people prefer a mechanical aid, such as a small rubberband. If the number of twiddles is to be counted, the counting is usually done mentally.

One proposed thumb twiddling mechanical aid that includes a counting mechanism is described in U.S. Pat. No. 4,227,342 entitled "Thumb Twiddling Toy." The toy described in this patent comprises a housing having a pair of closely spaced, parallel, tubular holes, each adapted to receive the first digit of a thumb. The walls of the holes are smooth and slippery, and have a diameter slightly greater than that of the inserted thumb. When the inserted thumbs are twiddled, the toy is rotated. The toy includes a counter that counts the number of times the toy is rotated, i.e., the number of twiddles.

Video games include controllers that produce (or modify) signals that control the position of objects on a video display screen. In competition games, each opponent uses a controller to control a game object. The most widely used controllers include a joystick that is movable in two orthogonal directions. Movement of the joystick controls movement, and thus, the position of the related object.

The present invention is directed to amusement devices, in particular, amusement devices that are operated by thumb twiddling. More specifically, the present invention is directed to thumb twiddling toys and controllers for controlling video game objects that are operated by thumb twiddling.

SUMMARY OF THE INVENTION

In accordance with this invention, an electromechanical thumb twiddling device is provided. The thumb twiddling device includes a flat, hand-held housing having a centrally located wheel with an oblong thumb slot. Peripherally located about the wheel are finger slots. When the fingers of a user are interleaved in the finger slots, and the thumbs are located in the thumb slot, thumb twiddling causes rotation of the wheel, which is sensed by a suitable rotational sensing mechanism.

In a toy form of the invention, the sensed thumb wheel rotations are utilized to control a counter that, in turn, controls a numerical display. Preferably, the rate of thumb twiddles is used to control the magnitude of the display. Alternatively, the numerical value may represent the total number of thumb twiddles.

In a controller form of the invention, the sensed thumb twiddle wheel rotations create or modify control signals suitable for controlling the movement of a video game object. The rate of object movement is controlled by the thumb twiddle rate and the linear direction of object movement is controlled by the thumb twiddle direction. Preferably, steering signals are provided by a tilt sensor orthogonally mounted in the flat housing.

In accordance with further aspects of this invention, a plurality of twiddle controllers are commonly interfaced to a video game controller. As a result, a plurality of video game players can simultaneously control the position and movement of related player objects on a video screen.

In accordance with yet other aspects of this invention the twiddle controllers are interfaced to the video game controller by an interface system that converts the analog steering signals produced by the twiddle controllers into digital form and multiplexes the resultant digital signals. Further, the interface system includes counting circuitry that counts twiddle controller wheel rotations and direction circuitry that determines the direction of wheel rotation, and supplies the resultant information to the video game controller.

As will be readily appreciated from the foregoing brief summary, the invention provides a thumb twiddle device that can be used to form a toy or a controller for video games. In the case of video game embodiments of the invention, the rate of twiddles controls the rate of movement of an object on the screen. Twiddle rotation direction controls the forward and backward movement of the object being controlled. Tilting of the thumb twiddle device to the right or left controls the angular direction of movement. Consequently, the invention provides a relatively uncomplicated device that produces (or controls) all of the signals needed to control the position and movement of a video game object. The invention also provides a system for interfacing the position and movement control signals created by a plurality of thumb twiddle devices with a video game controller.

BRIEF DESCRIPTION OF THE DRAWINGS

The foregoing and other advantages and features of the present invention will become more readily appreciated as the same becomes better understood by reference to the following detailed description when taken in conjunction with the accompanying drawings wherein:

FIG. 5 is a partially block and partially schematic diagram of the electronic portion of the twidometer illustrated in FIGS. 1-4;

DESCRIPTION OF THE PREFERRED EMBODIMENTS

This invention provides a device operated by thumb twiddling. The thumb twiddling device can be used to form a toy having a display for displaying thumb twiddle rate or accumulated thumb twiddles, herein referred to as a twidometer. Alternatively, the thumb twiddle device can be used to form a controller for controlling the position and movement of video game objects. In accordance with the invention, a plurality of thumb twiddle controllers can be combined to form an overall system for controlling a plurality of objects in an interactive video game. Regardless of form, a thumb twiddling device formed in accordance with the invention includes a wheel rotated by thumb twiddles and an electronic system for sensing wheel rotation and utilizing the sensed wheel rotation information to create (or modify) electronic controls signals.

TWIDOMETER

FIGS. 1-5 illustrate a toy form of a thumb twiddle device formed in accordance with this invention, e.g., FIGS. 1-5 illustrate a twidometer. The twidometer illustrated in FIGS. 1-5 includes a mechanical portion and an electrical portion. The mechanical portion is shown in FIGS. 1-4 and includes a rotatable wheel 21 mounted in a flat, hand-sized housing 23. More specifically, the wheel 21 is mounted in a cylindrical aperture 25 whose axis lies orthogonal to the plane of the flat housing 23. The cylindrical aperture 25 is circumscribed by a semicircular region 27, a head region 29 and a flange region 31, all forming a part of the housing 23. When the housing 23 is held in the hands of a player in the manner illustrated in FIG. 1 and described below, the head region 29 lies above the semicircular region 27, which faces the user. The flange region 31 is located on the side of the wheel 21 remote from the user.

Formed in the flange region 31 are a pair of elongate arcuate finger slots 33a and 33b. The arcuate finger slots 33a and 33b are located one above the other, and are sized and positioned such that a pair of interleaved fingers can fit into each slot. See FIG. 1. Centered in the wheel 21 is a thumb slot 35. The thumb slot 35 is elongate and sized such that a user's thumbs can be positioned at either end. The position of the thumb slot 35 with respect to the elongate finger slots 33a and 33b is such that when a pair of fingers from each hand are clasped together in an interleaved manner in the finger slots, the thumbs of the hands can be positioned at either end of the elongate thumb slot 35. As a result, when the thumbs are twiddled, the rotatable wheel 21 is rotated about its axis of rotation, which lies in the center of the elongate thumb slot 35.

Figure 3:
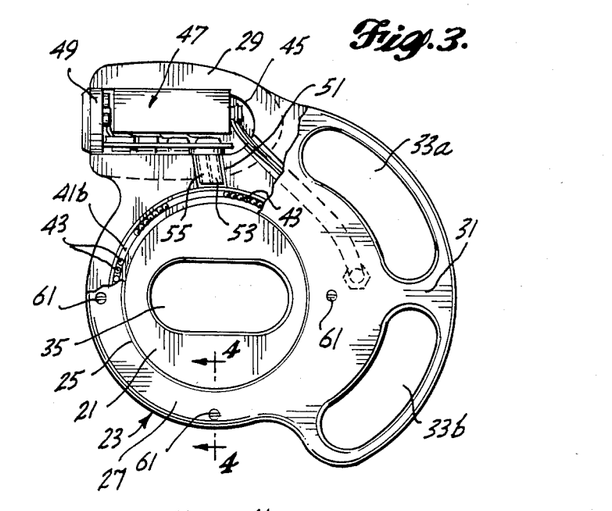
FIG. 3 is a side elevational view, partially in section, of the twidometer illustrated in FIG. 1.
Figure 4:
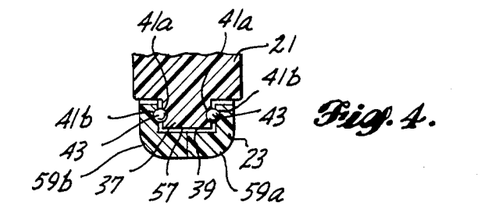
FIG. 4 is a cross-sectional view along line 4—4 of FIG. 3.

While various mechanisms can be used to rotatably mount the wheel 21 in the housing 23, as illustrated in FIGS. 3 and 4, the preferred mechanism includes an undercut protrusion 37 formed in the periphery of the wheel 21. The peripheral protrusion 37 lies in a slot 39 formed in the housing 23, around the periphery of the cylindrical apertures 25. Preferably, both the peripheral protrusion 37 and the receiving slot 39 have a rectangular cross-sectional configuration, as shown in FIG. 4. Formed in the sidewalls of the peripheral protrusion 37 and in the adjacent sidewalls of the slot 39 are grooves 41a and 41b. Located in the grooves 41a and 41b are balls 43. The grooves form bearing races and the balls form bearings, which allow the wheel 21 to be readily rotated in the housing 23.

Figure 1:
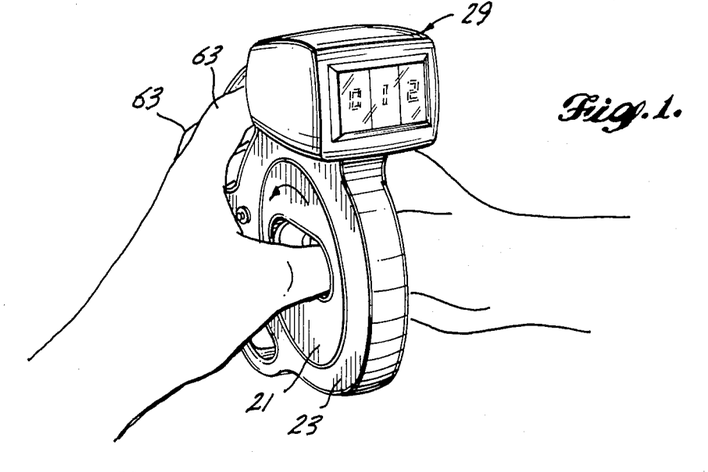
FIG. 1 is a pictorial view of a thumb twiddle toy, namely a twidometer, formed in accordance with the invention positioned in a user's hands.
Figure 2:
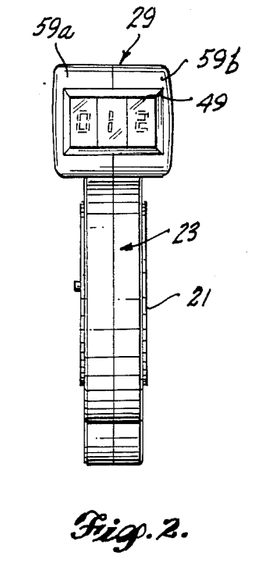
FIG. 2 is a front elevational view of the twidometer illustrated in FIG. 1.
Figures 5, 13:
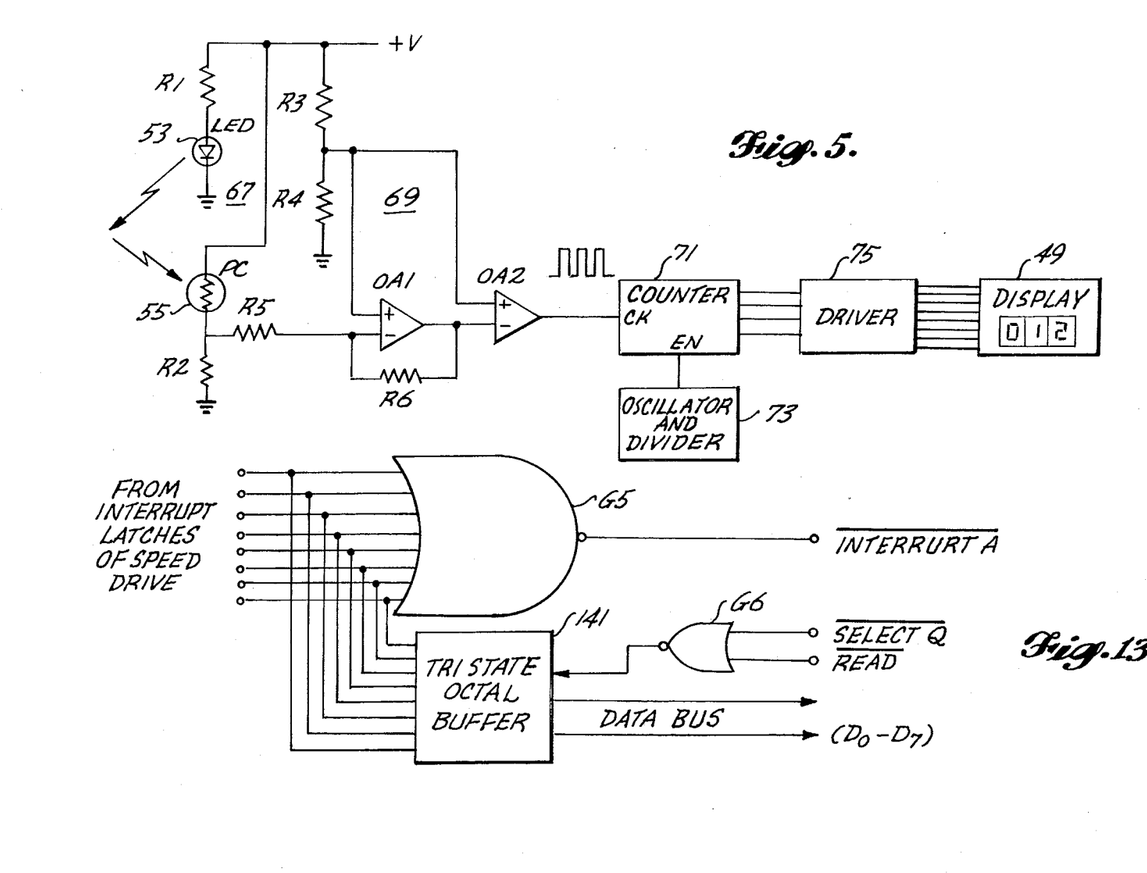

As illustrated in FIGS. 1 and 2, the head region 29 is thicker than the semicircular and flange regions 27 and 31 of the housing 23. The head region 29 includes a cavity 45 in which electronic components 47 and a display 49 are mounted. The electronic components 47 mounted in cavity 45 are illustrated in FIG. 5 and described below. The display 49 is mounted in a cavity entrance aperture. As shown in FIGS. 1 and 2, the display 49 is a numerical display. While the illustrated display is a three-segment display, it is to be understood that the display can include a greater or lesser number of segments.

Figures 8, 9:
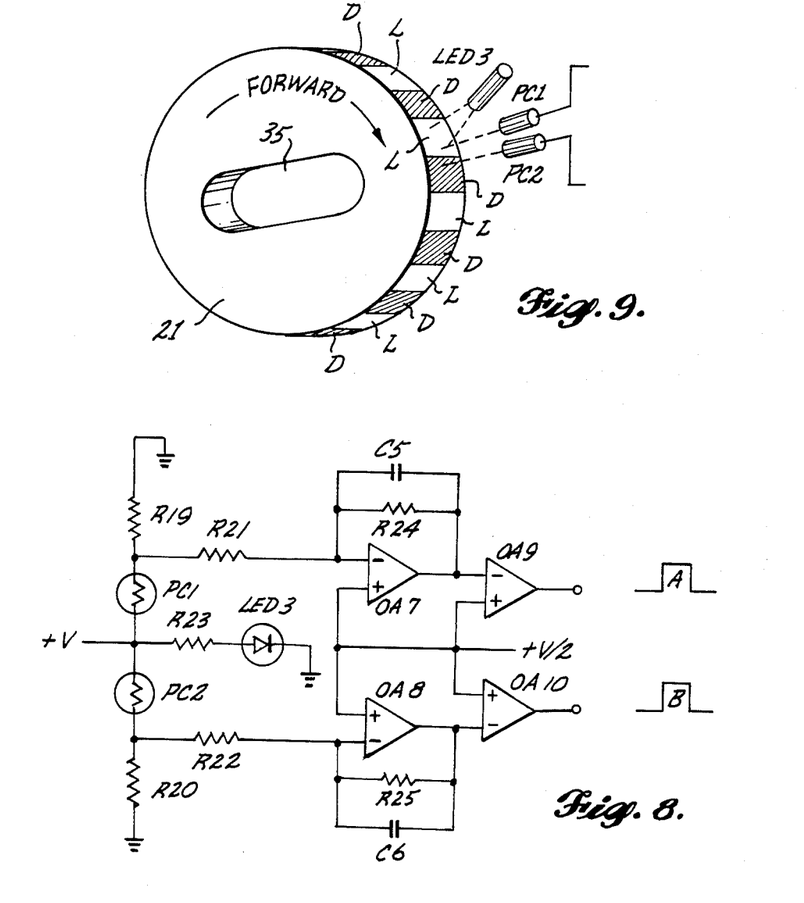
FIG. 8 is a schematic diagram of the speed circuit of a thumb twiddle controller formed in accordance with the invention.
FIG. 9 is a pictorial diagram illustrating the optical sensing portion of the steering circuit illustrated in FIG. 8.

A channel 51 extends between the cavity 45 in which the electronic components 47 are mounted and the cylindrical aperture 25 in which the wheel 21 is mounted. Mounted in the channel 51 is a light emitting diode (LED) 53 and at least one photocell (PC) 55. The LED 53 and the PC 55 are mounted such that the beam of light emitted by the LED 53 impinges on the outer surface 57 of the peripheral protrusion 37 of the wheel 21 and is reflected toward the PC 55. As illustrated in FIG. 9, and more fully described below, transverse dark and light strips are interspersed on the outer surface 57 of the peripheral flange 37 of the wheel 21. As a result, reflected light detected by the PC 55 pulsates when the wheel 21 is rotated. The pulses are used to control the number on the display 49.

While the housing 23 can be formed in various ways, as illustrated in FIGS. 2 and 4, preferably, the housing 23 is formed of two mirror image pieces 59a and 59b joined together by bolts 61. The pieces may be formed by injection molding a suitably strong plastic, for example.

As shown in FIG. 1, the thumb twiddling mechanism illustrated in FIGS. 1-3 is operated by placing the fingers 63 of a user in the finger slots 33a and 33b such that the index finger and the next finger of both hands are interleaved with one another in the upper slot 33a and the small finger and the next adjacent finger of both hands are interleaved with one another in the lower slot 33b. The user's thumbs are placed at the ends of the thumb slot 35. When the thumbs are twiddled, the wheel 21 is rotated. Rotation of the wheel causes the light emitted by the LED 53 to be reflected in a pulsating manner to the PC 55.

FIG. 5 is a partially schematic and partially block diagram of an electronic system, suitable for mounting in the cavity 45 in the head 29 of the housing 23, for counting the pulses formed at the output of the PC 55 and controlling the display 49. The electronic system includes: a wheel rotation sensing circuit 67; an amplifier and buffer circuit 69; a counter 71; an oscillator and divider circuit 73; a display driver circuit 75; and, the display 49.

In addition to the LED 53 and the PC 55, the wheel rotation sensing circuit includes two resistors designated R1 and R2. Voltage from a suitable power supply designated +V is connected through R1 in series with the LED 53 to ground. The PC 55 and R2 are also connected between +V and ground. The amplifier and buffer circuit 69 comprises: four resistors designated R3, R4, R5 and R6; and, two operational amplifiers designated OA1 and OA2. R3 and R4 are connected in series between +V and ground. The junction between R3 and R4 is connected to the noninverting input of both OA1 and OA2. The junction between the PC 55 and R2 is connected through R5 to the inverting input of OA1. R6 is connected between the output of OA1 and the inverting input of OA1. The output of OA1 is also connected to the inverting input of OA2.

The output of OA2 is connected to the clock input of the counter 71. The output of the oscillator and divider circuit 73 is connected to the enable input of the counter 71. The count outputs of the counter are connected to the inputs of the display driver 75; and, the outputs of the display driver are connected to the number control inputs of the display 49.

In operation, the pulsating light received by the PC 55 when the wheel 21 is rotated is amplified and buffered by the amplifier and buffer circuit 69. As a result, a plurality of rectangular pulses are produced at the output of OA2. These pulses are counted by the counter 71 when the counter is enabled by the oscillator and divider circuit 73. The resultant pulse count is interpreted by the driver 75, which uses the counter information to control the value shown by the display 49. Since the counter is enabled for a prescribed period of time, determined by the period of the pulses produced by the oscillator and divider circuit 73, the counter value is a rate value. Thus, the display displays the number of twiddles per unit of time, i.e, twiddles per minute, produced by the user. If the counter were to be continuously enabled, the counter value would be a total pulse count and, thus, be representative of the total number of twiddles.

VIDEO GAME CONTROLLER

Figure 6:
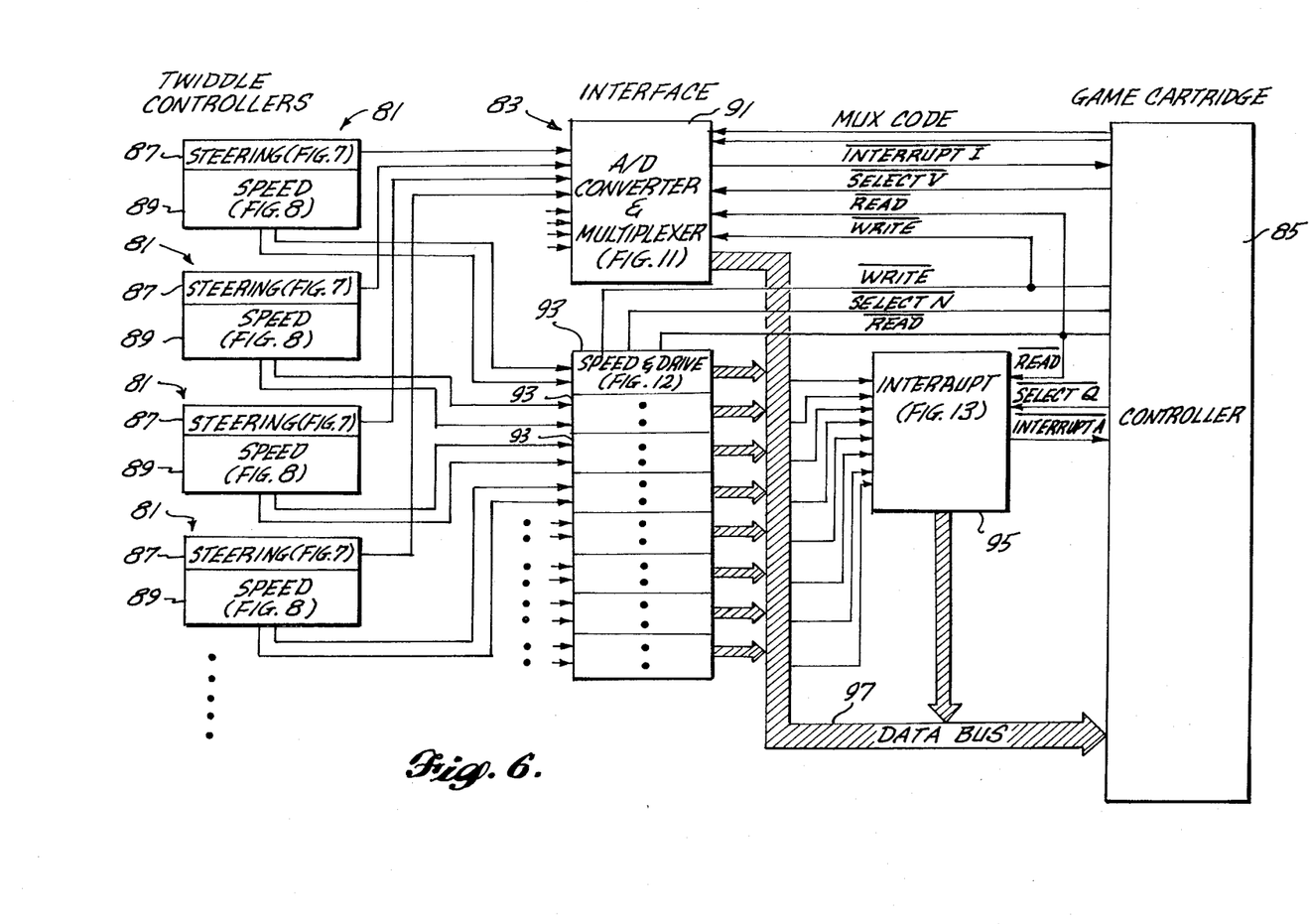
FIG. 6 is a block diagram of a system for controlling a plurality of player-related video game objects utilizing thumb twiddle controllers formed in accordance with the invention.

FIG. 6 is a block diagram of a system formed in accordance with the invention for providing signals suitable for controlling the position of the position controllable objects of a video game. The system illustrated in FIG. 6 includes: a plurality of twiddle controllers 81; and, an interface 83. Also illustrated in FIG. 6 is a game controller 85 that is normally packaged in a cartridge.

Each of the twiddle controllers 81 includes a housing 23 and a rotatable wheel 21 of the type illustated in FIGS. 1-4 and heretofore described. Mounted in each of the housings is a steering circuit 87 (FIG. 7) and a speed circuit 89 (FIG. 8). The steering and speed circuits 87 and 89 may be mounted in the cavity 45 of the head region 29, for example. While the head region 29 may include a display, since a display is not necessary to a video game controller, the display can be eliminated. Further, the head region 29 can be eliminated or reduced in size, if desired. Still further, the steering and speed circuits 87 and 89 can be mounted in a cavity located in some other region of the housing.

A twiddle controller 81 is provided for each game player. If the number of potential game players is equal to eight, the number of twiddle controllers is equal to eight. As will be better understood from the following description, unused twiddle controllers can be deactivated. As will also be better understood from the following description, the steering circuits 87 provide steering signals, i.e., signals designed to control the angular direction of movement of the object being controlled. The speed circuits 89 produce speed and linear direction (e.g., forward and backward) signals designed to control the forward and backward speed of the object being controlled.

The interface 83 includes: an A/D converter and multiplexer 91; a plurality of speed and drive circuits 93; and an interrupt circuit 95. The steering signals produced by the steering circuits 87 of the twiddle controllers 81 are each applied to one input of the A/D converter and multiplexer 91. The data output of the A/D converter and multiplexer 91 is applied to a data bus 97 that runs to the game controller 85. The A/D converter and multiplexer produces an interrupt signal, denoted $\overline{\text{INTERRUPT I}}$, which is sent to the controller 85 via a separate connecting wire. As will be better understood from the following description of the A/D converter and multiplexer circuit illustrated in FIG. 11, $\overline{\text{INTERRUPT I}}$ shifts from a normal high state to a low state when the A/D converter and multiplexer is ready to send data to the controller 85 via the data bus. The A/D converter and multiplexer 91 reaches a plurality of separate control signals from the game controller 85. These signals include: a multiplexer code signal denoted MUX CODE; a select signal denoted $\overline{\text{SELECT V}}$; a read signal denoted $\overline{\text{READ}}$; and, a write signal denoted $\overline{\text{WRITE}}$. MUX CODE is a multibit signal. The state of the MUX CODE bits determine which of the steering signals is to be converted by the A/D converter and multiplexer 91 and sent to the game controller via the data bus 97. $\overline{\text{SELECT V}}$ is normally high. $\overline{\text{SELECT V}}$ shifts low when the game controller designates the A/D converter and multiplexer 91 as the subsystem to respond to the $\overline{\text{READ}}$ and $\overline{\text{WRITE}}$ signals in the manner hereinafter described.

One of the speed circuits 89 is connected to each of the speed and drive circuits 93. The speed and drive circuits 93 produce data signals and interrupt signals. The data signals are applied to the data bus 97 that goes to the game controller 85. The interrupt signals are applied to the interrupt circuit 95.

The interrupt circuit 95 produces data signals that are applied to the data bus 97 and an interrupt signal denoted $\overline{\text{INTERRUPT A}}$ that is applied to the game controller 85 via a separate wire. $\overline{\text{INTERRUPT A}}$ shifts from its normal high state to a low state each time one of the speed and drive circuits produces an interrupt signal. The interrupt circuit 95 receives two control signals from the controller 85 denoted $\overline{\text{READ}}$ and $\overline{\text{SELECT Q}}$. $\overline{\text{SELECT Q}}$ is normally high. When $\overline{\text{SELECT Q}}$ goes low, the interrupt circuit 95 is conditioned to respond to the $\overline{\text{READ}}$ signal.

The speed and drive circuits 93 receive three control signals from the game controller 85 designated $\overline{\text{WRITE}}$, $\overline{\text{READ}}$ and $\overline{\text{SELECT N}}$. The $\overline{\text{READ}}$ and the $\overline{\text{WRITE}}$ signals are common to each of the speed and drive circuits and are the same $\overline{\text{READ}}$ and $\overline{\text{WRITE}}$ signals that are applied to the A/D converter and multiplexer 91. $\overline{\text{SELECT N}}$ is actually a multitude of separate select signals, one for each of the speed and drive circuits (e.g., $\overline{\text{SELECT N}}$ represents $\overline{\text{SELECT N1}}$, $\overline{\text{SELECT N2}}$...). As with $\overline{\text{SELECT V}}$, the $\overline{\text{SELECT N}}$ signals determine which of the speed and drive circuits is to respond to the $\overline{\text{READ}}$ and $\overline{\text{WRITE}}$ signals. More specifically, the $\overline{\text{SELECT N}}$ signals are normally high. When one of these signals shifts low, the related speed and drive circuit is enabled to respond to changes in the state of the $\overline{\text{READ}}$ and $\overline{\text{WRITE}}$ signals.

In operation, either the A/D converter and multiplexer 91 or the interrupt circuit 95 can send an interrupt signal to the game controller 85. As will be better understood from the following description of the A/D converter and multiplexer circuit illustrated in FIG. 11, $\overline{\text{INTERRUPT I}}$ shifts from a low state to a high state at the end of each A/D conversion. Sometime after receiving an $\overline{\text{INTERRUPT I}}$ high-low shift, the game controller causes $\overline{\text{SELECT V}}$ to shift from high to low, which allows the A/D converter and multiplexer to respond to $\overline{\text{READ}}$ and $\overline{\text{WRITE}}$ changes in state. These changes enable the A/D converter and multiplexer to read the output of one of the steering circuits 87. Which steering circuit output is read is determined by the state of the MUX CODE bits. The $\overline{\text{READ}}$ signal is then converted into digital form and the result applied to the data bus 97.

As previously noted, $\overline{\text{INTERRUPT A}}$ shifts from a high state to a low state when the interrupt output of one or more of the speed and drive circuits produces an interrupt signal. Shortly after $\overline{\text{INTERRUPT A}}$ goes low, the game controller 85 causes $\overline{\text{SELECT Q}}$ to shift from a high state to a low state. The high-low state shift of $\overline{\text{SELECT Q}}$ enables the interrupt circuit to respond to state changes in the $\overline{\text{READ}}$ signal. When $\overline{\text{READ}}$ shifts from its normal high state to a low state, the interrupt circuit 95 applies a signal to the data bus 97 that designates which of the steering and drive circuit(s) produced the interrupt signal that caused $\overline{\text{INTERRUPT A}}$ to shift from high to low. The game controller 85 then interrogates the appropriate speed and drive circuit(s), using the $\overline{\text{SELECT N}}$ and the $\overline{\text{READ}}$ and $\overline{\text{WRITE}}$ signals resulting in speed information being sent to the computer via the data bus 97.

Figure 7:
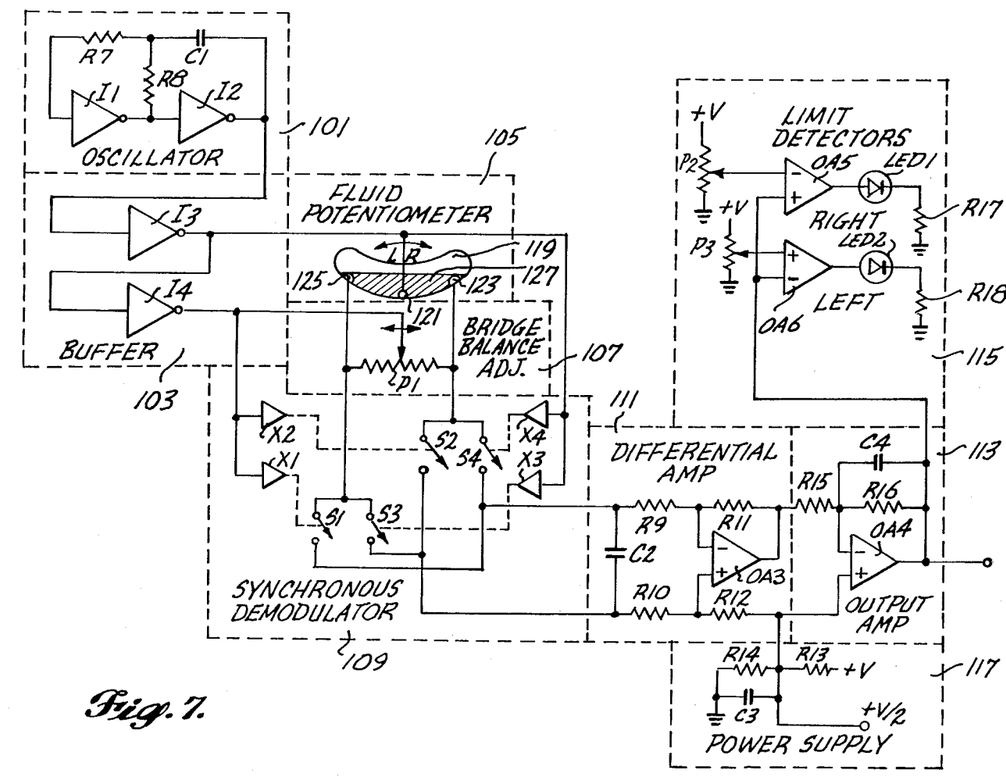
FIG. 7 is a schematic diagram of the steering circuit of a thumb twiddle controller formed in accordance with the invention.

FIG. 7 is a schematic diagram of a steering circuit suitable for use in the twiddle controllers 81 illustrated in FIG. 6. The steering circuit illustrated in FIG. 7 includes: an oscillator 101; a buffer 103; a fluid potentiometer 105; a bridge balance adjustment circuit 107; a synchronous demodulator 109; a differential amplifier 111; an output amplifier 113; and, limit detectors 115. Also illustrated in FIG. 7 is a power supply 117.

The oscillator 101 includes: first and second resistors designated R7 and R8; a capacitor designated C1; and, two inverting amplifiers designated I1 and I2. The output of I1 is connected to the input of I2. R7 and C1 are connected in series in that order between the output of I2 and the input of I1. The junction between R7 and C1 is connected through R8 to the junction between I1 and I2. The oscillator 101 functions in a conventional manner to produce a square wave output signal having a frequency that is determined by the value of R7, R8 and C1.

The buffer 103 comprises first and second inverting amplifiers designated I3 and I4. The output of I2 of the oscillator 101 is connected to the input of I3. The output of I3 is connected to the input of I4. Hence, I3 and I4 form two series connected buffer amplifiers.

The fluid potentiometer 105 includes a closed, elongate vial 119. The vial 119 is curved (i.e., arcuately shaped) when viewed from one side. Preferably, the cross-sectional configuration of the vial is cylindrical.

The vial 119 is mounted in the housing 23 of the thumb twiddling device such that the vial lies orthogonal to the plane of the housing. Further, the vial is positioned and oriented such that the ends of the vial point upwardly and the curved center of the vial points downwardly when the housing 23 is held in the manner previously described. Thus, the vial is in the position illustrated in FIG. 7. Located on the inside of the vial, at the curved "bottom," is a center electrode 121. Also located on the bottom inside of the vial 119, near the outer ends, are right and left electrodes 123 and 125. The right and left electrodes 123 and 125 are spaced from the center electrode 121. While the electrodes can take on various forms, preferably, they are gold flashed electrodes. The vial houses an electrical conducting fluid 127 whose resistance is dependent upon the amount of fluid through which current must pass. One suitable conducting fluid is medical grade tincture of merthiolate in a 1:1000 solution. The output of I3 of the buffer 103 is connected to the center electrode 121 of the fluid potentiometer 105.

The bridge balance adjustment circuit 107 comprises a potentiometer designated P1. The adjustable terminal of P1 is connected to the output of I4. The end terminals of P1 are connected to the right and left electrodes 123 and 125 of the fluid potentiometer 105. As will be readily appreciated from this circuit arrangement, the adjustable terminal of P1 can be adjusted to balance the resistance of the conducting fluid between the electrodes 121, 123 and 125. More specifically, when the housing 23 of the thumb twiddling device is in a vertical position, P1 is adjusted to balance the resistance of the conducting fluid between the right electrode and the center electrode and the resistance of the conducting fluid electrode between the left electrode and the center electrode. As a result, the voltage drop between the center electrode and the right electrode will be the same as the voltage drop between the center electrode and the left electrode when the oscillator 101 produces a fluctuating signal.

The synchronous demodulator 109 comprises a quad switch. Preferably, the quad switch is a semiconductor switch. For purposes of illustration, the quad switch is schematically shown as comprising four control elements designated X1, X2, X3 and X4 and four single pole-single throw switches designated S1, S2, S3 and S4, each operated by their numerically related controller. That is, X1 controls the state of S1, X2 controls the state of S2, X3 controls the state of S3, and X4 controls the state of S4. S1, S2, S3 and S4 each have two states: open and closed. The output of I3 of the buffer 103 is connected to control inputs of X3 and X4 and the output of I4 is connected to control inputs of X1 and X2. Since the output of I4 is the inverted output of I3, X1 and X2 cause S1 and S2 to be closed when X3 and X4 cause S3 and S4 to be open and vice versa. Thus, the states of S1 and S2 are always opposite to the states of S3 and S4. The right electrode 123 of the fluid potentiometer 105 is connected to one terminal of each of S2 and S4. The left electrode 125 of fluid potentiometer 105 is connected to one terminal of each of S1 and S3. The other terminals of S1 and S4 are connected together as are the other terminals of S2 and S3. The output signal of the synchronous demodulator, which is applied to the differential amplifier 111, occurs across these common connections.

As will be readily appreciated from FIG. 7 and the foregoing description, the synchronous demodulator is driven at the same frequency as the oscillator signal applied to the fluid potentiometer. That is, S1, S2, S3 and S4 are open and closed at the oscillator signal frequency. Since the synchronous demodulator demodulates the output of the fluid potentiometer at the oscillator signal frequency, the synchronous demodulator creates a DC signal whose magnitude is related to the ratio of the resistance of the conducting fluid located between the right electrode 123 and the center electrode 121 and the resistance of the conducting fluid located between the left electrode 125 an the center electrode 121. This resistance ratio, in turn, is related to the tilt of the vial 119 and, thus, the tilt of the plane of the housing 23. As a result, when the thumb twiddling device housing is tilted, the synchronous demodulator produces a floating voltage whose magnitude is related to the tilt angle. The polarity of the voltage is related to whether the tilt is to the right or to the left.

The differential amplifier 111 includes: four resistors designated R9, R10, R11 and R12; a capacitor designated C2; and, an operational amplifier designated OA3. The junction between S1 and S4 of the synchronous demodulator is connected through R9 to the inverting input of OA3. The junction between S2 and S3 is connected through R10 to the noninverting input of OA3. C2 is connected across the junction between S1 and S4 and the junction between S2 and S3. R11 is connected between the output of OA3 and the inverting input of OA3. R12 is connected between the noninverting input of OA3 and the power supply 117. In operation, the input circuit of the differential amplifier forms a filter that reduces or entirely eliminates any fluctuations in the DC voltage produced by the synchronous demodulator 109. The differential amplifier also amplifies the output of the synchronous demodulator and references the synchronous demodulator output to the voltage produced by the power supply.

The power supply 117 comprises: two resistors of equal value designated R13 and R14; and, a capacitor designated C3. R13 and R14 are connected between a voltage source designated +V and ground. C3 is connected in parallel with R14. The junction between R14 and R13, denoted +V/2, is connected through R12 of the differential amplifier to the noninverting input of OA3, as discussed above. Thus, the power supply 117 provides a voltage reference for the differential amplifier that is equal to one-half the value of +V.

The output amplifier 113 comprises: two resistors designated R15 and R16; a capacitor designated C4; and, an operational amplifier designated OA4. The output of OA3 is connected through R15 to the inverting input of OA4. The junction between R12 and the power supply is connected to the noninverting input of OA4. C4 and R16 are connected in parallel between the output of OA4 and the inverting input of OA4. The output amplifier 113 functions in a conventional manner to amplify the output of the differential amplifier 111.

The limit detectors 115 include: two potentiometers designated P2 and P3; two operational amplifiers designated OA5 and OA6; two light emitting diodes designated LED1 and LED2; and, two resistors designated R17 and R18. The two potentiometers P2 and P3 are each connected between +V and ground. The adjustable contact of P2 is connected to the inverting input OA5 and the adjustable contact of P3 is connected to the noninverting input of OA6. The output of OA4 of the output amplifier 113 is connected to the noninverting input of OA5 and to the inverting input of OA6. The output of OA5 is connected through LED1 in series with R17 to ground. The output of OA6 is connected through LED2 in series with R18 to ground.

LED1 functions as a right limit indicator and LED2 functions as a left limit indicator. More specifically, as previously discussed, when the housing 23 of the thumb twiddle device is tilted to the right or the left, the fluid 127 in the vial 119 shifts to the right or the left. The resulting fluid unbalance causes a voltage unbalance that, in turn, causes a positive or negative voltage on the output of the output amplifier 113. When the fluid potentiometer shifts too far to the right or the left, the voltage on the output of the output amplifier 113 exceeds the voltage level set by P2 or P3 causing the output of OA5 or OA6 to switch states resulting in LED1 or LED2 being lit. Thus, the limit detectors provide a visual indication of when the thumb twiddling device housing has been rotated to a limit point beyond which no increase in the output of the output amplifier will affect the object being steered.

FIG. 8 is a schematic diagram of a speed circuit suitable for use in the twiddle controllers 81 shown in FIG. 6. The steering circuit illustrated in FIG. 8 comprises: two photocells designated PC1 and PC2; a light emitting diode designated LED3; seven resistors designated R10 through R25; two capacitors designated C5 and C6; and, four operational amplifiers designated OA7, OA8, OA9 and OA10. PC1 is connected in series with R19 between +V and ground and PC2 is connected in series with R20 between +V and ground. Further, R23 is connected in series with LED3 between +V and ground. The injunction between R19 and PC1 is connected through R21 to the inverting input of OA7. The junction between PC2 and R20 is connected through R22 to the inverting input of OA8. R24 is connected in parallel with C5 between the output of OA7 and the inverting input of OA7. R25 is connected in parallel with C6 between the output of OA8 and the inverting input of OA8. The output of OA7 is connected to the inverting input of OA9 and the output of OA8 is connected to the inverting input of OA10. The noninverting inputs of OA7, OA8, OA9, and OA10 are all connected to the +V/2 output of the power supply (FIG. 7).

FIG. 9 illustrates how LED3, PC1 and PC2 (FIG. 8) are positioned in the twiddle controller housing 23 in relation to the outer surface of the wheel 21. As shown, LED3 is positioned so that the light beam produced by LED3 impinges on the edge 57 of the peripheral protrusion 37 of the wheel 21. As previously noted, the peripheral protrusion includes a plurality of sequential light and dark strips, denoted L and D, respectively, in its outer surface. PC1 and PC2 are positioned to receive light reflected by the light areas L. The dark areas reflect substantially no light. Further, PC1 and PC2 are positioned such that they are spaced from one another by a small amount in the direction of rotation of the wheel 21. As a result, when a change from a dark strip to a light strip occurs, light will first impinge on one of PC1 and PC2 before impinging on the other photocell. Which one receives light first depends upon the direction of rotation. In the forward direction, PC1 will receive light before PC2, whereas in the reverse direction, PC2 will receive light before PC1. It is this difference in light receipt times that is utilized in the hereinafter described circuitry to determine whether the wheel 21 is being rotated in the forward direction or the reverse direction.

Figure 10:
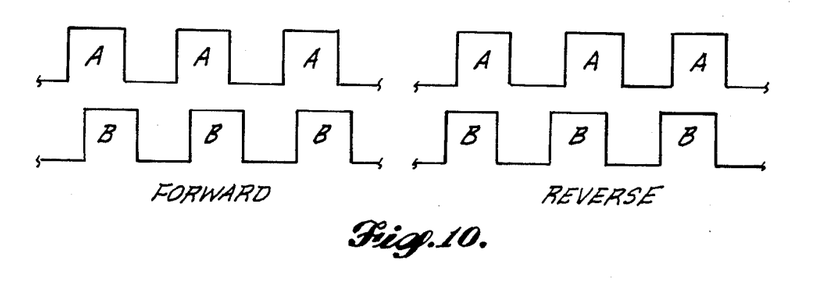
FIG. 10 is a timing diagram illustrating the relationship of directional pulses formed by the speed circuit illustrated in FIG. 8.

Returning to FIG. 8, the intensity of the light inpinging on PC1 and PC2 determines whether the noninverting inputs of OA7 and OA8 are above or below $+V/2$. As the wheel 21 revolves, the light detected by PC1 and PC2 is alternately shifted between high and low levels. $+V/2$ is chosen such that each time a shift between high and low levels occurs, the output state of OA7 shifts. As a result, when the wheel is rotated, the outputs of OA9 and OA10 form a series of rectangular waves, denoted as A and B in FIG. 8. As shown in FIG. 10, while the A and B wave frequencies are the same, the B waves lead the A waves when the wheel 21 is rotated in the forward direction. When the wheel 21 is rotated in the reverse direction, the A waves lead the B waves. As noted above, it is this difference in phase that is utilized to determine the direction of rotation of the wheel 21. The wave frequency is related to the speed of the wheel. Hence the A and B rectangular waves contain both speed and linear (e.g., forward and backward) direction information.

Figure 11:
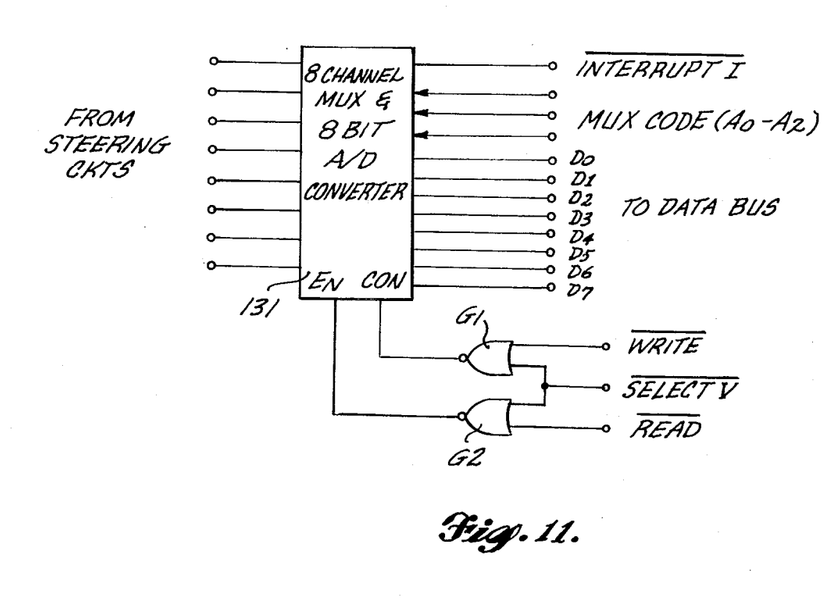
FIG. 11 is a block diagram of an A/D converter and multiplexer circuit suitable for use in the interface section of the system illustrated in FIG. 6.

FIG. 11 is a logic diagram of an A/D converter and multiplexer 91 suitable for use in the interface part of the video game object control system illustrated in FIG. 6. As noted above, the A/D converter and multiplexer 91 receives the signals produced by the steering circuits 87 of the twiddle controllers 81. The A/D converter and multiplexer illustrated in FIG. 11 includes: an 8-channel multiplexer & 8-bit analog-to-digital (A/D) converter; and, two two-input NOR gates designated G1 and G2. The signals produced by the steering circuits are each applied to one of the data inputs of the 8-channel multiplexer & 8-bit A/D converter 131. The $\overline{\text{INTERRUPT I}}$ signal is produced by the 8-channel multiplexer & 8-bit A/D converter. As previously noted, $\overline{\text{INTERRUPT I}}$ shifts from high to low when the 8-channel multiplexer & 8-bit A/D converter 131 is ready to convert one of its inputs. As previously discussed, and as shown in FIG. 6, $\overline{\text{INTERRUPT I}}$ is applied to the game controller 85. The MUX CODE signal is a three bit ($A_0$–$A_2$) signal whose bit state determines which of the eight data inputs of the 8-channel multiplexer & 8-bit A/D converter is to be converted. As previously noted, the MUX CODE signal is produced by the game controller 85. The MUX CODE signal is applied to the 8-channel multiplexer & 8-bit A/D converter 131. The 8-channel multiplexer & 8-bit A/D converter produces an eight bit parallel output ($D_0$–$D_7$) that is applied to the data bus 97, as previously described.

The $\overline{\text{WRITE}}$ signal as applied to one input of G1 and the $\overline{\text{READ}}$ signal as applied to one input of G2. The $\overline{\text{SELECT V}}$ signal is applied to the second inputs of G1 and G2. As illustrated in FIG. 6 and previously described, the $\overline{\text{WRITE}}$, $\overline{\text{READ}}$ and $\overline{\text{SELECT V}}$ signals are all produced by the game controller 85. The output of G1 is applied to the conversion control (CON) input of the 8-channel multiplexer & 8-bit A/D converter and the output of G2 is applied to the enable (EN) input of the 8-channel multiplexer & 8-bit A/D converter.

The state of $\overline{\text{SELECT V}}$ controls whether G1 and G2 are enabled (i.e., able to respond to the state of $\overline{\text{READ}}$ and $\overline{\text{WRITE}}$) or disabled. When $\overline{\text{SELECT V}}$ is low, G1 and G2 are enabled. When $\overline{\text{SELECT V}}$ is high, G1 and G2 are disabled. When $\overline{\text{SELECT V}}$ is low and $\overline{\text{WRITE}}$ shifts low, the 8-channel multiplexer & 8-bit A/D converter is instructed to convert into eight bit digital from the analog signal on the input determined by the bit status of $A_0$–$A_2$. When $\overline{\text{SELECT V}}$ is low and $\overline{\text{READ}}$ shifts low, the 8-channel multiplexer & 8-bit A/D converter is enabled to apply the eight bit signal to the eight data bus lines.

Figure 12:
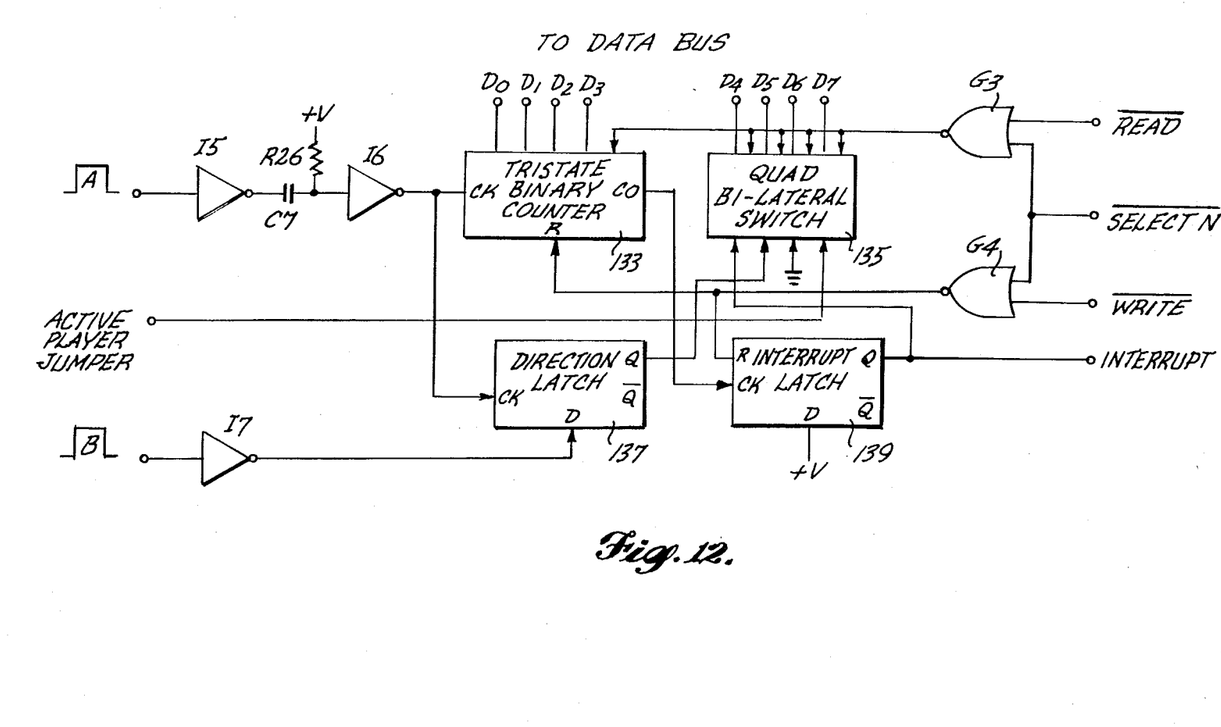
FIG. 12 is a block diagram of a speed and drive circuit suitable for use in the interface section of the system illustrated in FIG. 6; and, FIG. 13 is a block diagram of an interrupt circuit suitable for use in the interface section of the system illustrated in FIG. 6.

FIG. 12 illustrates a speed and drive circuit suitable for use in the system illustrated in FIG. 6 to receive the A and B rectangular wave signals produced by the speed circuits 89 (FIG. 8) and create data suitable for transmission to the game controller 85 via the data bus. As illustrated in FIG. 6, a speed and drive circuit is needed for each of the speed circuits. The speed and drive circuit illustrated in FIG. 12 comprises: three inverting amplifiers designated I5, I6, and I7; a resistor designated R26; a capacitor designated C7; two two-input NOR gates designated G3 and G4; a tristate binary counter 133; a quad bilateral switch 135; a direction latch 137; and, an interrupt latch 139. The direction and interrupt latches 137 and 139 are D flip-flops. The miscellaneous inputs of the various components illustrated in FIG. 2 not used are not illustrated in order to avoid unnecessarily complicating the figure.

The A rectangular wave signal produced by the related speed circuit 89 (FIG. 8) is applied through I5 in series with C7 to the input of I6. The junction between C7 and I6 is connected to $+V$. The output of I6 is connected to the clock input of the tristate binary counter 133 and to the clock input of the directional latch 137. The B rectangular wave signal produced by the related speed circuit 89 is applied through I7 to the D input of the direction latch 137.

The tristate binary counter 133 produces four data output bits designated $D_0$, $D_1$, $D_2$ and $D_3$. Tthe quad bilateral switch produces four data outputs designated $D_4$, $D_5$, $D_6$ and $D_7$. Thus, the outputs of the tristate binary counter and the quad bilateral switch form eight data bits. These are the data bits that are sent to the game controller 85 via the data bus 97.

The carry or overflow output (CO) of the tristate binary counter is applied to the clock input of the interrupt latch 139. The D input of the interrupt latch is connected to $+V$. The Q output of the interrupt latch forms the interrupt signal that is applied to the interrupt circuit (FIG. 13). In addition, the Q output of the interrupt latch is applied to the $D_4$ related input of the quad bilateral switch 135. The Q output of the directional latch is applied to the $D_5$ related input of the quad bilateral switch 135. The $D_6$ related input is connected to ground. The $D_7$ related input of the quad bilateral switch 135 is connected to a control terminal designated ACTIVE PLAYER JUMPER. The grounded or ungrounded state of the ACTIVE PLAYER JUMPER determines the high-low state of the $D_7$ signal.

The $\overline{\text{READ}}$ signal produced by the game controller 85 is applied to one input of G3. The $\overline{\text{WRITE}}$ signal produced by the game controller 85 is applied to one input of G4. The other inputs of G3 and G4 receive the $\overline{\text{SELECT N}}$ control signal produced by the controller. As a result, when $\overline{\text{SELECT N}}$ is low, G3 and G4 are enabled to respond to the $\overline{\text{READ}}$ and $\overline{\text{WRITE}}$ signals. When $\overline{\text{SELECT N}}$ is high, G3 and G4 are disabled and, thus, do not respond to the $\overline{\text{READ}}$ and $\overline{\text{WRITE}}$ signals.

The output of G3 is applied to the control input of the tristate binary counter and to the control inputs of each stage of the quad bilateral switch 135. When the output of G3 is low, the tristate binary counter and quad bilateral switch apply their respective $D_0$ through $D_3$ and $D_4$ through $D_7$ data bits to the data bus. When the output of G3 is high, the outputs of the tristate binary counter and the quad bilateral switch float. As a result, data signals produced by the A/D converter and multiplexer 91 and the interrupt circuit 95 can be sent to the game controller 85 without speed and drive circuit interference. The output of G4 is applied to the reset input of the tristate binary counter 133 and to the reset input of the interrupt latch 139.

In operation, I5 in combination with R26 and C7 turn the A wave signal produced by the related speed circuit 89 (FIG. 8) into a series of pulses having the same frequency as the A wave signal frequency. The pulses are inverted by I6 and used to clock the tristate binary counter 133 and the direction latch 137. Each time the tristate binary counter receives a pulse, it is incremented by one. Each time the direction latch receives a clock pulse, it reads the signal on its D input. The high-low state of the signal on the D input of the direction latch is related to whether the B wave is leading or lagging the A wave. If the B wave is leading the A wave, the D input is low when a clock pulse occurs because the B wave is inverted by I7. As a result, the Q output of the direction latch shifts low the first time the direction latch is clocked and remains low when subsequent clock pulses occur until the leading/lagging relationship of the A and B waves changes. Contariwise, if the B wave is lagging the A wave, the D input is high when a clock pulse occurs. Thus, the Q output of the direction latch shifts high and remains high. As will be readily appreciated from this description and the previous description of the speed circuit illustrated in FIG. 8, if the wheel 21 is rotated in the forward direction, the Q output of the direction latch is high. If the wheel 21 is rotated in the reverse direction, the Q output of the direction latch is low. Thus, the state of the Q output of the direction latch denotes the direction of rotation of the wheel 21 of the twiddle controller.

When the tristate binary counter 133 reaches its maximum count value, the overflow (CO) output of the tristate binary counter shifts from a low state to a high state. When this shift occurs, the interrupt latch is clocked. When the interrupt latch is clocked, it reads the high voltage on its D input, resulting in the Q output of the interrupt latch shifting from a low state to a high state. As a result, an interrupt signal is applied to the interrupt circuit (FIG. 13). As previously noted, receipt of an interrupt signal by the interrupt circuit causes $\overline{\text{INTERRUPT A}}$ to shift from a high state to a low state, resulting in the game controller 85 interrogating the interrupt circuit to determine which of the speed and drive circuits caused the interrupt signals. When this is determined, the game controller causes the $\overline{\text{SELECT N}}$ signal of the related speed and drive circuit to shift from a high state to a low state. As a result, as previously described, G3 and G4 of that circuit are enabled to respond to the state of the $\overline{\text{READ}}$ and $\overline{\text{WRITE}}$ signals. Shortly after, or simultaneously with the $\overline{\text{SELECT N}}$ signal shifting low, the $\overline{\text{READ}}$ signal shifts low. When this occurs, the data stored in the tristate binary counter and the quad bilateral switch is applied to the data bus. After this data is received by the game controller 85, $\overline{\text{READ}}$ shifts from a low state to a high state and $\overline{\text{WRITE}}$ shifts from a high state to a low state. When $\overline{\text{WRITE}}$ shifts from a high state to a low state, the tristate binary counter 133 and the interrupt latch 139 are reset. Thereafter, the cycle of operation of the speed and direction circuit is repeated. That is, the tristate binary counter begins counting. When full, its CO output shifts high, causing an interrupt that results in the game controller reading the tristate binary counter and the quad bilateral switch $D_0$–$D_7$ outputs.

In summary, data bits $D_0$ through $D_3$ produced by the tristate binary counter represent the speed of rotation of the wheel 21 of the related twiddle controller. Data bit $D_4$ denotes whether or not a tristate binary counter overflow signal has occurred. This information is necessary because all of the speed and drive circuits could be read each time any one of the speed and drive circuits creates an interrupt, or because the speed and drive circuits are to be read at predetermined intervals in addition to being read when an interrupt signal occurs. The state of the $D_5$ bit denotes the direction of rotation of the wheel of the related twiddle controller. The $D_6$ data bit is unused. The state of the $D_7$ data bit denotes whether the related twiddle controller is active. If the twiddle controller is not being utilized, the ACTIVE PLAYER JUMPER input is grounded causing the $D_7$ data bit to be low. If the twiddle controller is being used, the ACTIVE PLAYER JUMPER input is high, resulting in the $D_7$ data bit being high. If the $D_7$ data bit is low, the game controller 85 ignores all of the other data bits produced by the related speed and drive circuit 93.

FIG. 13 is a logic diagram of an interrupt circuit suitable for use in the system illustrated in FIG. 6. The interrupt circuit illustrated in FIG. 13 comprises: an eight-input NOR gate designated G5; a two-input NOR gate designated G6; and, an eight bit tristate octal buffer 141. The interrupt signals produced by the interrupt latches 139 of each of the speed and drive circuits 93 are applied to one of the inputs of G5 and one of the inputs of th tristate octal buffer 141. The output of G5 is the $\overline{\text{INTERRUPT A}}$ signal that is applied to the game controller 85 in the manner heretofore described. The data outputs of the tristate octal buffer 141 are applied to the data bus such that each of the inputs of the tristate octal buffer forms one of the $D_0$–$D_7$ data bits. The $\overline{\text{SELECT Q}}$ and $\overline{\text{READ}}$ signals produced by the game controller 85 are each applied to one of the inputs of G6. The output of G6 is applied to the enable input of the tristate octal buffer 141.

In operation, when the Q output of the interrupt latch of any of the speed and drive circuits shifts from a low state to a high state, the output of G5 shifts from a low state to a high state. Thus, $\overline{\text{INTERRUPT A}}$ shifts from a high state to a low state. As previously described, this results in the game controller 85 causing $\overline{\text{SELECT Q}}$ to shift from a high state to a low state. As a result, G6 is enabled to respond to $\overline{\text{READ}}$ shifting from a high state to a low state. When this occurs, the tristate octal buffer 141 is enabled to apply its input signals to the data bus. As a result, a parallel data signal (data bits $D_0$–$D_7$) denoting the state of the Q output of the interrupt latches of all of the speed and drive circuits 93 is sent to the game controller 85. If the Q output of only one of the interrupt latches has shifted from a low state to a high state, the game controller may only interrogate the related speed and drive circuit in the manner heretofore described. Alternatively, the game controller may interrogate all of the speed and drive circuits. Or, if the Q output of two or more of the interrupt latches are in a high state when the tristate octal buffer is enabled, only the related speed and drive circuits may be interrogated.

As will be readily appreciated from the foregoing description, the invention provides thumb twiddle operated devices. The invention can be embodied in a selfcontained toy that provides a display that can be calibrated in terms of rate of twiddles or number of twiddles, as desired. Alternatively, the invention can be embodied in a video game controller, i.e., a controller used to control the movement of objects on a video display screen. If only a single object is to be controlled by a single player, most, if not all, of the interface illustrated in FIGS. 6 through 13 is not needed. Alternatively, the interface can be modified to accommodate a greater or lesser number of twiddle controllers. Further, it is to be understood that the electronic circuits illustrated and described herein are exemplary. Similarly, it is to be understood that various changes can be made in the twiddle mechanism. For example, the light and dark bars can be located on the side of the wheel and the LED and PCs repositioned accordingly. Further, rotation sensing mechanisms, other than optical mechanisms, can be used, magnetic and mechanical rotation sensing mechanisms, for example. Hence, within the scope of the appended claims, the invention can be practiced otherwise than as specifically described herein.

The embodiments of the invention in which an exclusive property or privilege is claimed are defined as follows:

1. A thumb twiddling device comprising:
    a flat housing sized to be held between a user's hands, said housing including elongate aperture means suitable for receiving the fingers of a user and a cylindrical aperture suitable for rotatably receiving a wheel;
    a wheel rotatably mounted in said cylindrical aperture in said housing, said wheel including a slot positioned such that the thumbs of a user's hand can be positioned at the ends of said slot when said housing is held between a user's hands and the fingers of the user's hands are located in said elongate aperture means; and,
    electronic means for sensing the rotation of said wheel and producing a fluctuating signal whose frequency is related to the frequency of rotation of said wheel suitable for controlling a display.

2. A thumb twiddling device as claimed in claim 1 wherein said electronic means includes a numerical display.

3. A thumb twiddling device as claimed in claim 2 wherein said fluctuating signal controls said numerical display such that said numerical display is representative of the rate of rotation of said wheel.

4. A thumb twiddling device as claimed in claim 1 wherein:
    said flat housing includes a semicircular region, a head region and a flange region surrounding said circular aperture;
    said elongate aperture means includes two apertures that are formed in said flange region; and,
    said electronic means and said display are mounted in said head region.

5. A thumb twiddling device as claimed in claim 4 wherein said electronic means includes a numerical display.

6. A thumb twiddling device as claimed in claim 5 wherein said fluctuating signal controls said numerical display such that said numerical display is representative of the rate of rotation of said wheel.

7. A thumb twiddling device as claimed in claim 4 wherein:

(a) said wheel includes alternating light and dark regions located around the periphery of said wheel; and,
(b) said electronic means for sensing the rotation of said wheel includes:
    (1) light emitting means for emitting a light beam that impinges on the path of travel of said light and dark regions as said wheel is rotated; and,
    (2) light detecting means positioned so as to receive the fluctuating light created by said light beam emitted by said light emitting means and reflected by said light and dark regions and creating a corresponding electric fluctuating signal.

8. A thumb twiddling device as claimed in claim 7 wherein said electronic means includes a numerical display.

9. A thumb twiddling device as claimed in claim 8 wherein said fluctuating signal controls said numerical display such that said numerical display is representative of the rate of rotation of said wheel.

10. A thumb twiddling device as claimed in claim 7 wherein said electronic means also includes counter means for counting the fluctuations of the electrical fluctuating signal created by said light detecting means when said wheel is rotated.

11. A thumb twiddling device as claimed in claim 1 wherein:
(a) said wheel includes alternating light and dark regions located around the periphery of said wheel; and,
(b) said electronic means for sensing the rotation of said wheel includes:
    (1) light emitting means for emitting a light beam that impinges on the path of travel of said light and dark regions as said wheel is rotated; and,
    (2) light detecting means positioned so as to receive the fluctuating light created by said light beam emitted by said light emitting means and reflected by said light and dark regions and creating a corresponding electric fluctuating signal.

12. A thumb twiddling device as claimed in claim 1 wherein said fluctuating signal is suitable for controlling the speed of movement of a video game object.

13. A thumb twiddling device as claimed in claim 1 wherein:
    said electronic means produces two fluctuating signals whose frequency is related to the frequency of rotation of said wheel;
    the phase relationship between said two fluctuating signals defines the direction of rotation of said wheel; and,
    said two fluctuating signals are suitable for controlling the linear direction as well as the speed of movement of a video game object.

14. A thumb twiddling device as claimed in claim 13 wherein:
(a) said wheel includes alternating light and dark regions located around the periphery of said wheel; and,
(b) said electronic means for sensing the rotation of said wheel includes:
    (1) light emitting means for emitting a light beam that impinges on the path of travel of said light and dark regions as said wheel is rotated; and,
    (2) light detecting means positioned so as to receive the fluctuating light created by said light beam emitted by said light emitting means and reflected by said light and dark regions and creating said two fluctuating signals.

15. A thumb twiddling device as claimed in claim 13 wherein said electronic means also includes tilt sensing means for sensing the tilting of said flat housing and producing a steering signal suitable for controlling the direction of movement of said video display object.

16. A thumb twiddling device as claimed in claim 15 wherein:
    (a) said wheel includes alternating light and dark regions located around the periphery of said wheel; and,
    (b) said electronic means for sensing the rotation of said wheel includes:
        (1) light emitting means for emitting a light beam that impinges on the path of travel of said light and dark regions as said wheel is rotated; and,
        (2) light detecting means positioned so as to receive the fluctuating light created by said light beam emitted by said light emitting means and reflected by said light and dark regions and creating said two fluctuating signals.

17. A thumb twiddling device as claimed in claim 15 wherein said tilt sensing means includes a fluid potentiometer mounted in said flat housing, said fluid potentiometer including an elongate vial, three spaced apart electrical contacts mounted in said vial and an electrically conductive liquid housed in said vial, the electrical conductivity of said electrically conductive liquid being related to the volume of said liquid through which an electric current passes, said three electrical contacts being located along the length of said elongate vial such that one contact forms a center contact and the other two contacts form right and left contacts, said vial being positioned in said housing such that the tilting of said housing varies the volume of liquid located between said center contact and said right and left contacts.

18. A thumb twiddling device as claimed in claim 17 wherein said tilt sensing means also includes:
    (a) an oscillator for applying an oscillatory signal to said center contact of fluid potentiometer; and,
    (b) synchronous demodulator means connected to said oscillator and said right and left contacts of said fluid potentiometer for demodulating the signal applied to said center contact by said oscillator in a manner that produces a DC signal whose magnitude is related to the ratio of the volume of the elctrically conductive liquid located between the center contact and the right and left contacts of said fluid potentiometer and, thus, the angle of tilt of the related twiddle controller housing and whose polarity is related to the direction of tilt.

19. A thumb twiddling device as claimed in claim 18 wherein said electronic means for sensing the rotation of said wheel includes:
    (a) counter means for counting one of said two fluctuating speed signals to determine the speed of said wheel; and,
    (b) direction means for comparing said two fluctuating speed signals to determine the direction of rotation of said wheel.

20. A thumb twiddling device as claimed in Claim 15 wherein said electronic means for sensing the rotation of said wheel includes:
    (a) counter means for counting one of said two fluctuating speed signals to determine the speed of said wheel; and,
    (b) direction means for comparing said two fluctuating speed signals to determine the direction of rotation of said wheel.

21. Apparatus for producing control signals suitable for controlling the movement of video game objects comprising:
    (a) a plurality of twiddle controllers, each of said twiddle controllers comprising:
        (1) a flat housing sized to be held between a user's hands, said housing including elongate aperture means suitable for receiving the interleaved fingers of a user's hand and a cylindrical aperture suitable for rotatably receiving a wheel;
        (2) a wheel rotatably mounted in said cylindrical aperture in said housing, said wheel including a slot positioned such that the thumbs of a user's hand can be positioned at the ends of said slot when said housing is located between a user's hands and the fingers of the user's hands are located in said elongate aperture means; and,
        (3) speed and tilt means for:
            (i) sensing the rotation of said wheel;
            (ii) producing two fluctuating speed signals whose frequency is related to the speed of rotation of said wheel and whose phase relationship is related to the direction of rotation of said wheel;
            (iii) detecting the angle of tilt of said housing; and,
            (iv) producing a steering signal whose magnitude is related to said angle of tilt;
    (b) an interface for interfacing said twiddle controllers to a video game controller, said interface comprising:
        (1) converter means connected to said twiddle controllers and said video game controller for:
            (i) receiving said steering signals;
            (ii) converting said steering signals into a form suitable for receipt by said video game controller; and,
            (iii) transmitting said converted signals to said video game controller; and,
        (2) speed and drive means connected to said twiddle controllers and said video game controller for:
            (i) receiving the two fluctuating speed signals produced by each of said twiddle controllers, determining the speed of rotation and the direction of rotation of said wheel of each of said twiddle controllers based on said two fluctuating speed signals;
            (ii) converting said speed of rotation and direction information into a signal form suitable for receipt by said video game controller; and,
            (iii) transmitting said converted signals to said video game controller.

22. Apparatus for producing control signals suitable for controlling the movement of video game objects as claimed in claim 21 wherein:
    (a) said wheel includes alternating light and dark regions located about the periphery of the wheel; and,
    (b) said speed and tilt means includes:
        (1) light emitting means for emitting a light beam that impinges on the path of travel of said light and dark regions as said wheel is rotated; and,
        (2) first and second light detecting means positioned along the path of said light and dark regions for receiving the fluctuating light created by said light beam emitted by said light emitting means and reflected by said light and dark regions and creating two corresponding electric fluctuating signals, said two corresponding electric fluctuating signals forming said two fluctuating speed signals.

23. Apparatus for producing control signals suitable for controlling the movement of video game objects as claimed in claim 22 wherein said converter means includes an analog-to-digital converter and multiplexer for converting said steering signals produced by said speed and tilt means into digital signals suitable for receipt by said video game controller.

24. Apparatus for producing control signals suitable for controlling the movement of video game objects as claimed in claim 23 wherein said speed and tilt means includes a fluid potentiometer mounted in said flat housing, said fluid potentiometer including an elongate vial, three spaced apart electrical contacts mounted in said vial and an electrically conductive liquid housed in said vial, the electrical conductivity of said electrically conductive liquid being related to the volume of said liquid through which an electric current passes, said three electrical contacts being located along the length of said elongate vial such that one contact forms a center contact and the other two contacts form right and left contacts, said vial being positioned in said housing such that the tilting of said housing varies the volume of liquid located between said center contact and said right and left contacts.

25. Apparatus for producing control signals suitable for controlling the movement of video game objects as claimed in claim 24 wherein said speed and tilt means also includes:
  (a) an oscillator for applying an oscillatory signal to said center contact of fluid potentiometer; and,
  (b) synchronous demodulator means connected to said oscillator and said right and left contacts of said fluid potentiometer for demodulating the signal applied to said center contact by said oscillator in a manner that produces a DC signal whose magnitude is related to the ratio of the volume of the electrically conductive liquid located between the center contact and the right and left contacts of said fluid potentiometer and, thus, the angle of tilt of the related twiddle controller housing and whose polarity is related to the direction of tilt.

26. Apparatus for producing control signals suitable for controlling the movement of video game objects as claimed in Claim 25 wherein said speed and drive means of said interface includes:
  (a) counter means for counting one of said two fluctuating speed signals to determine the speed of said wheel; and,
  (b) direction means for comparing said two fluctuating speed signals to determine the direction of rotation of said wheel.

27. Apparatus for producing control signals suitable for controlling the movement of video game objects as claimed in claim 26 wherein said converter means produces an interrupt signal suitable for interrupting the operation of said video game controller when said converter means is ready to transmit a converted signal to said video game controller.

28. Apparatus for producing control signals suitable for controlling the movement of video game objects as claimed in claim 27 wherein said speed and drive means produces an interrupt signal suitable for receipt by said video game controller when said speed and drive means is ready to transmit a converted signal to said video game controller.

29. Apparatus for producing control signals suitable for controlling the movement of video game objects as claimed in claim 21 wherein said speed and tilt means includes a fluid potentiometer mounted in said flat housing, said fluid potentiometer including an elongate vial, three spaced apart electrical contacts mounted in said vial and an electrically conductive liquid housed in said vial, the electrical conductivity of said electrically conductive liquid being related to the volume of said liquid through which an electric current passes, said three electrical contacts being located along the length of said elongate vial such that one contact forms a center contact and the other two contacts form right and left contacts, said vial being positioned in said housing such that the tilting of said housing varies the volume of liquid located between said center contact and said right and left contacts.

30. Apparatus for producing control signals suitable for controlling the movement of video game objects as claimed in claim 29 wherein said speed and tilt means also includes:
  (a) an oscillator for applying an oscillatory signal to said center contact of fluid potentiometer; and,
  (b) synchronous demodulator means connected to said oscillator and said right and left contacts of said fluid potentiometer for demodulating the signal applied to said center contact by said oscillator in a manner that produces a DC signal whose magnitude is related to the ratio of the volume of the electrically conductive liquid located between the center contact and the right and left contacts of said fluid potentiometer and, thus, the angle of tilt of the related twiddle controller housing and whose polarity is related to the direction of tilt.

31. Apparatus for producing control signals suitable for controlling the movement of video game objects as claimed in claim 30 wherein said speed and drive means of said interface includes:
  (a) counter means for counting one of said two fluctuating speed signals to determine the speed of said wheel; and,
  (b) direction means for comparing said two fluctuating speed signals to determine the direction of rotation of said wheel.

32. Apparatus for producing control signals suitable for controlling the movement of video game objects as claimed in claim 21 wherein said speed and drive means of said interface includes:
  (a) counter means for counting one of said two fluctuating speed signals to determine the speed of said wheel; and,
  (b) direction means for comparing said two fluctuating speed signals to determine the direction of rotation of said wheel.

* * * * *